(12) United States Patent
Wesling

(10) Patent No.: US 7,216,881 B2
(45) Date of Patent: May 15, 2007

(54) CABLE GUIDE FOR A BICYCLE SUSPENSION FORK

(75) Inventor: Kevin Wesling, Lombard, IL (US)

(73) Assignee: SRAM Corporation, Chicago, IL (US)

( * ) Notice: Subject to any disclaimer, the term of this patent is extended or adjusted under 35 U.S.C. 154(b) by 128 days.

(21) Appl. No.: 10/707,136

(22) Filed: Nov. 21, 2003

(65) Prior Publication Data

US 2005/0110238 A1    May 26, 2005

(51) Int. Cl.
*B62K 21/02*   (2006.01)
*B62K 21/04*   (2006.01)
*B62K 23/00*   (2006.01)
*F16C 1/10*   (2006.01)

(52) U.S. Cl. ................. 280/276; 280/275; 280/279; 280/280; 74/500.5; 74/502.2; 188/285

(58) Field of Classification Search ............... 280/279, 280/280; 74/551.1–551.8, 502.4, 502.6, 74/501.5 R; 188/24.11
See application file for complete search history.

(56) References Cited

U.S. PATENT DOCUMENTS 4,766,982 A * 8/1988 Hayashi et al. ......... 188/181 A
5,435,208 A * 7/1995 Chen ........................... 74/570
5,484,032 A * 1/1996 Li ............................ 188/24.21
5,560,260 A * 10/1996 Kuo ........................... 74/502.4
6,609,722 B1 * 8/2003 Miyoshi et al. ............. 280/280
6,767,024 B1 * 7/2004 Kuo ........................... 280/276

OTHER PUBLICATIONS

SR Suntour Suspension Products 2003 Catalog, 2002, pp. 14 and 15, SR Suntour, Taiwan.
RockShox 2003 Product Catalog, 2002, SRAM Corporation, United States.

* cited by examiner

*Primary Examiner*—Lesley D. Morris
*Assistant Examiner*—Marc A. Scharich
(74) *Attorney, Agent, or Firm*—Milan Milosevic; Lisa Serdynski

(57) ABSTRACT

A cable guide routing a control cable that extends between an actuator and a suspension system having a crown connecting two parallel tubular bodies to a steerer tube. The cable guide includes a housing formed on the crown and having a bore extending therethrough for receiving the control cable. The suspension system includes a spool located on an end of one of the tubular bodies for winding and unwinding the control cable. The housing is configured on the suspension system such that a portion of the control cable extending between the housing and the spool lies substantially in a plane of the spool. So configured, friction is minimized.

4 Claims, 4 Drawing Sheets

CABLE GUIDE FOR A BICYCLE SUSPENSION FORK

BACKGROUND OF INVENTION

The present invention relates to cable guides for bicycles, and more particularly to a cable guide for a control cable extending between an actuator and a suspension system.

Bicycle suspension systems are designed to absorb the impacts and vibrations typically experienced by riders when the bicycle traverses irregularities on the riding surface. Some suspension systems are provided with a lockout mechanism that turns the suspension on or off. When the suspension is on, it is compliant and displaces in response to bumps in the road. When the suspension is off or "locked out," it becomes substantially rigid and does not displace in response to road irregularities. Additionally, suspension systems have been provided with control devices that adjust the characteristics of the suspension such as travel and spring rate. Typically, a rider operates these control devices by turning a knob located at the top or the bottom of the fork. So located, the rider must remove his or her hand from the handlebar to operate the knob.

To solve the above problem, a remote actuator is provided on the handlebar and is connected to the lockout mechanism through a control cable. The cable system should be routed as directly as possible to minimize friction. By minimizing friction in the cable system, the actuating force at the handlebar is also minimized. Advantageously, the control cable is protected from contaminants to minimize friction. Further, to reduce cost, it is desirable to provide a remote actuator that is retrofitted to an existing control device local to the suspension system. This may be accomplished by replacing the actuator or knob of the existing control device with a simple spool connectable to the control cable.

A cable guide 100 for a remote actuated suspension system has been previously provided as shown in FIG. 1, however, there are several drawbacks to the system. The guide 100 includes a redirect spool 110 for changing the direction of the control cable 116 extending from a lever 118 located on a top 130 of the fork. The spool 110 is located at a very high stress point 112 on a crown 114. Further, the 180-degree change in direction of the control cable between the lever and the spool, adds friction, thereby reducing the life of the control cable.

Another cable guide 130 for a remote actuated suspension system is shown in FIG. 2. There is also a drawback to this design: the cable guide 130 clamps onto a cap 134 of the suspension system. The cap 134 has a low profile to avoid interference with the bicycle frame. Accordingly, there is limited space on the cap 134 to attach the cable guide 130. As a result, the cable guide 130 can be easily snapped off the cap 134 by a strong pulling force on the control cable 136. Further, the system of FIG. 2 is not easily retrofittable to an existing control device local to the suspension system. Therefore, there is a need for a cable guide that minimizes friction, contamination and cost.

SUMMARY OF INVENTION

The present invention provides a cable guide for a control cable extending between an actuator and a suspension system including a crown connecting two parallel tubular bodies to a steerer tube. The cable guide includes a housing formed on the crown and having a bore extending therethrough for receiving the control cable. The housing is configured on the crown such that a portion of the control cable extending between the housing and the spool lies substantially in a plane of the spool. So configured, friction is minimized.

In one embodiment of the present invention, the actuator is a lever located on a handlebar and the suspension system is a bicycle front suspension fork, including a crown having first and second bores extending therethrough for receiving first and second tubular bodies or legs, respectively. A steerer tube is received in a third bore of the crown located between the first and second bores. A spool is mounted on an end of one of the first and second legs. The housing is forged with the crown of the fork at a low stress point. The housing includes a radially inwardly extending flange for engaging the outer casing or sheath of the cable, while the inner wire of the cable passes through the bore of the housing and is connected to the spool. The housing is located on the crown such that a portion of the inner wire extending between the housing and the spool lies substantially in a plane of the spool to minimize friction.

These and other features and advantages of the invention will be more fully understood from the following description of certain embodiments of the invention, taken together with the accompanying drawings.

DETAILED DESCRIPTION

Figure 1:
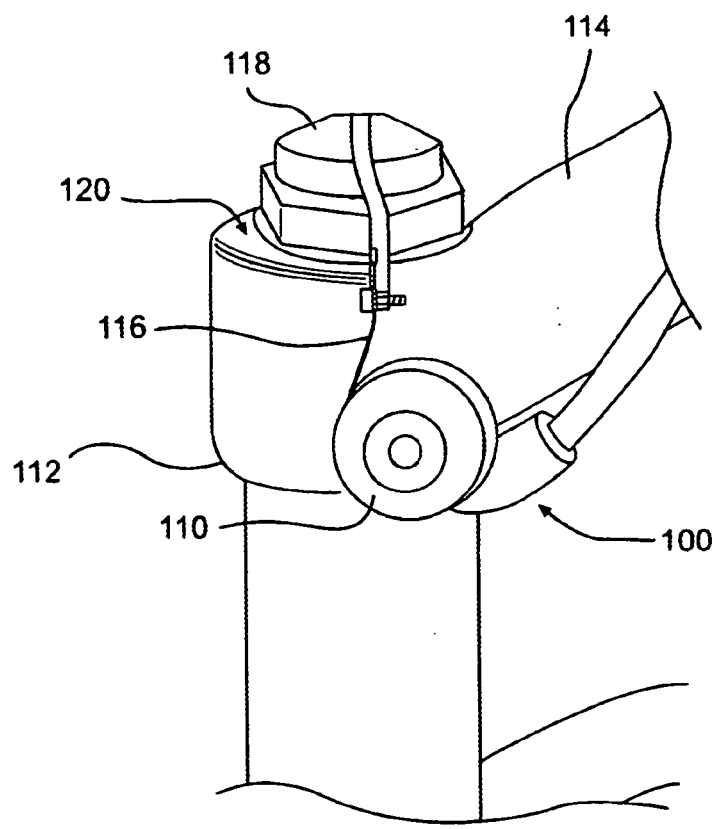
FIG. 1 is a perspective view of a prior art cable guide for a remote actuated bicycle suspension system.
Figure 2:
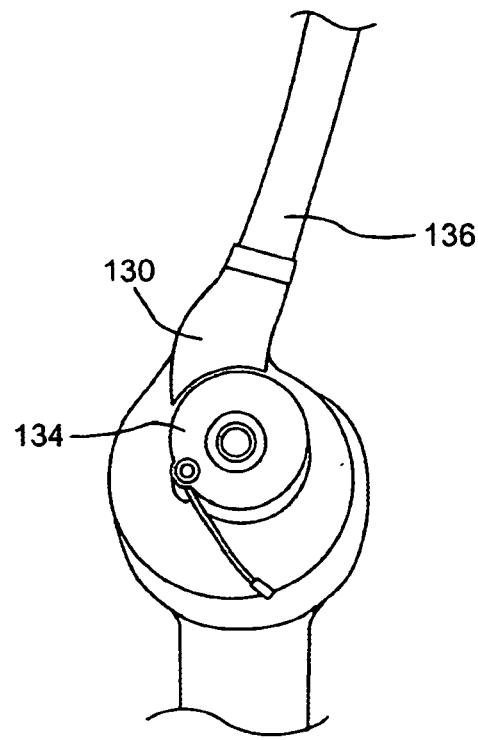
FIG. 2 is a perspective view of another prior art cable guide for a remote actuated bicycle suspension system.
Figure 3:
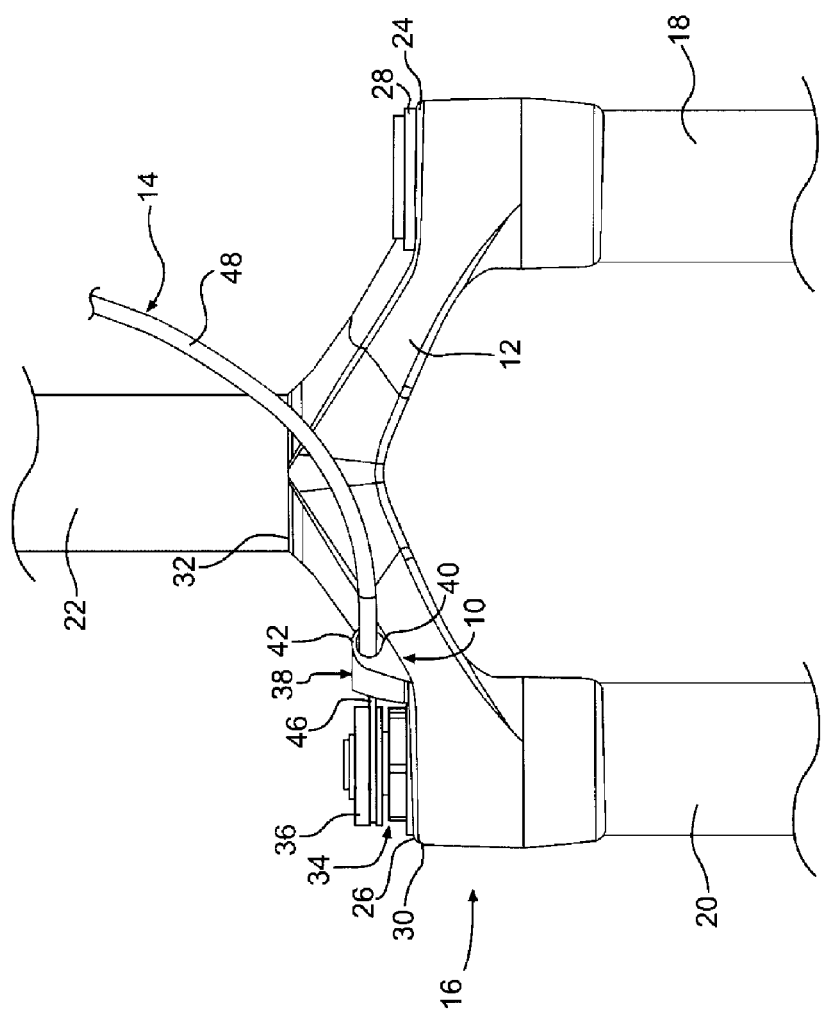
FIG. 3 is a perspective view of a cable guide in accordance with one embodiment of the present invention.
Figure 5:
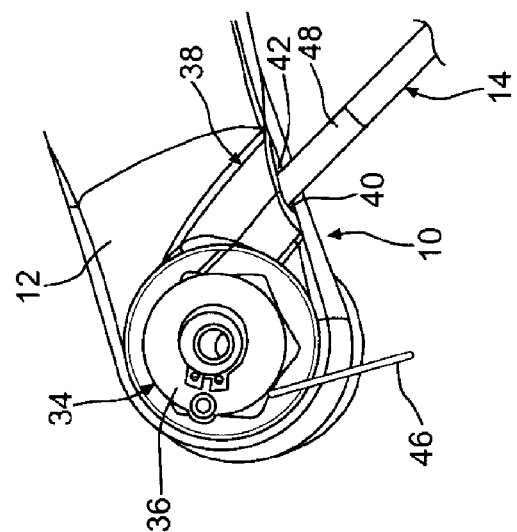
FIG. 5 is a top view of the cable guide of FIG. 3.
Figure 4:
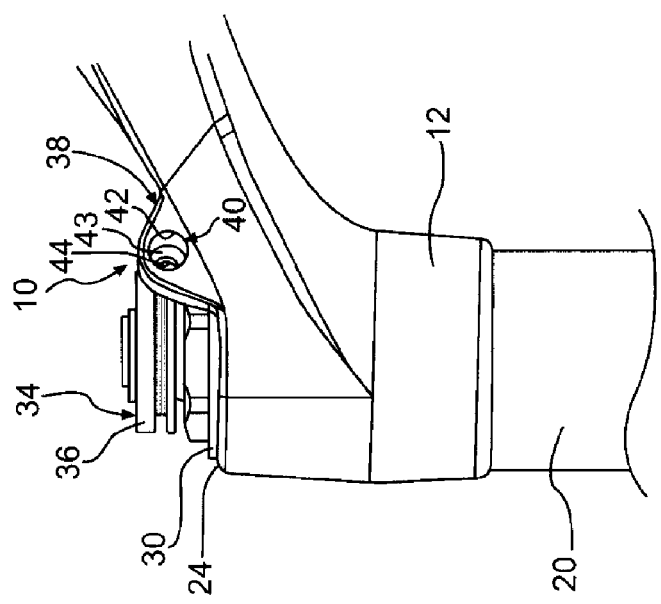
FIG. 4 is a front view of the cable guide of FIG. 3.

FIGS. 3–5 illustrate a cable guide 10 in accordance with one embodiment of the present invention. As shown in FIG. 3, the cable guide 10 is located on a crown 12 for a bicycle front suspension fork. The cable guide 10 directs a control cable 14 extending between an actuator, such as a lever located on a handlebar, and a bicycle suspension system 16.

The crown 12 is a portion of the suspension fork 16 that connects two fork legs 18, 20 to a steerer tube 22. The crown 12 is forged for strength. The leg 18 may contain a spring assembly, and the other leg 20 may contain a damping mechanism (not shown). The crown 12 includes two bores 24, 26 extending therethrough for receiving ends 28, 30 of the legs 18, 20, respectively. The other ends of the legs (not shown) are connected to a wheel axle. The crown 12 further includes a third bore 32 located between the two openings 24, 26 for receiving the steerer tube 22. The legs 18, 20 and steerer tube 22 may be press fit into the openings 24, 26, 32, respectively, or secured to the crown 12 with setscrews.

A lockout mechanism 34 is connected to the damping mechanism to adjust the damping mechanism between at least two settings, a first setting wherein the suspension is substantially rigid and a second setting wherein the suspension is permitted to absorb an impact. The lockout mechanism 34 is actuated by a rider pivoting the lever located on the handlebar, resulting in the control cable being pulled or released. The lockout mechanism 34 includes a spool 36 located at the end 30 of the leg 20 for winding or unwinding the control cable 14.

The cable guide 10 includes a housing 38 preferably forged with the crown 12. The housing includes a central bore 40 extending longitudinally therethrough with a first open end 42 and a second open end 44. The control cable 14 includes an inner wire 46 that slides within an outer casing or sheath 48. As shown in FIG. 4, the housing 38 includes a radially inwardly extending flange 43 for engaging the outer casing 48 of the control cable 14, while the inner wire 46 of the control cable 14 passes through the central bore 40 and is connected to the spool 36 of the lockout mechanism 34. The inner wire 46 reciprocally winds or unwinds around the spool 36 as the control cable 14 is being pulled and released. The housing 38 is preferably located on the crown 12 such that the inner wire 46 lies substantially in a plane of the spool 36, to minimize friction. Further, the housing is located at a low stress point of the crown.

While this invention has been described by reference to a preferred embodiment, it should be understood that numerous changes could be made within the spirit and scope of the inventive concepts described. Accordingly, it is intended that the invention not be limited to the disclosed embodiment, but that it have the full scope permitted by the language of the following claims.

The invention claimed is:

1. A cable guide for a control cable extending between an actuator and a suspension system having a crown connecting two parallel tubular bodies to a steerer tube, said cable guide comprising: a housing integrally formed with the crown as a one piece configuration, the housing having a bore extending therethrough for receiving the control cable.

2. The cable guide of claim 1 wherein the suspension system further comprises a spool disposed on one end of the tubular bodies for winding and unwinding the control cable, the housing configured such that a portion of the control cable extending between the housing and the spool lies substantially in a plane of the spool.

3. The cable guide of claim 2 wherein the control cable includes an inner wire encased in an outer casing, the housing having a radially extending flange for engaging the outer casing while permitting the inner wire to extend through the bore.

4. The cable guide of claim 1 wherein the housing and the crown are forged together.

* * * * *